United States Patent
Kwon

(10) Patent No.: US 12,208,640 B2
(45) Date of Patent: Jan. 28, 2025

(54) METHOD OF PROVIDING LIGHT CONTROL MEMBER AND METHOD OF PROVIDING DISPLAY DEVICE HAVING LIGHT CONTROL MEMBER

(71) Applicant: Samsung Display Co., Ltd., Yongin-si (KR)

(72) Inventor: Sunyoung Kwon, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 662 days.

(21) Appl. No.: 17/496,849

(22) Filed: Oct. 8, 2021

(65) Prior Publication Data
US 2022/0227156 A1   Jul. 21, 2022

(30) Foreign Application Priority Data
Jan. 20, 2021  (KR) .......................... 10-2021-0008228

(51) Int. Cl.
*B41M 7/00*  (2006.01)
*B41M 3/00*  (2006.01)

(52) U.S. Cl.
CPC .......... *B41M 7/0081* (2013.01); *B41M 3/003* (2013.01)

(58) Field of Classification Search
CPC ..... B41M 7/0081; B41M 3/003; G02B 5/206; G02B 6/0026; G02B 6/0065; H10K 50/85; H10K 50/50; H10K 50/845; H10K 59/12; H10K 59/38; H10K 71/00
See application file for complete search history.

(56) References Cited

U.S. PATENT DOCUMENTS 7,199,393 B2    4/2007  Park et al.
10,126,598 B2 * 11/2018  Han ................. G02F 1/133514

FOREIGN PATENT DOCUMENTS

| JP | H11-020330 A | 1/1999 |
| JP | 2009-237132 A | 10/2009 |
| JP | 2020-094174 A | 6/2020 |
| KR | 1020170072418 A | 6/2017 |
| WO | 2018/225782 A1 | 12/2018 |

* cited by examiner

*Primary Examiner* — William P Fletcher, III
(74) *Attorney, Agent, or Firm* — CANTOR COLBURN LLP

(57) ABSTRACT

A method of providing a light control member includes providing a plurality of barrier walls spaced apart from each other and defining a concave portion therebetween, providing a light control resin including a quantum dot in the concave portion, providing a first light having a wavelength equal to or greater than about 430 nanometers and equal to or smaller than about 500 nanometers to the light control resin, providing a second light having a wavelength shorter than the wavelength of the first light to the light control resin to which the first light is irradiated, and providing heat-treating the light control resin to which the second light is irradiated.

20 Claims, 14 Drawing Sheets

METHOD OF PROVIDING LIGHT CONTROL MEMBER AND METHOD OF PROVIDING DISPLAY DEVICE HAVING LIGHT CONTROL MEMBER

This application claims priority to Korean Patent Application No. 10-2021-0008228, filed on Jan. 20, 2021, and all the benefits accruing therefrom under 35 U.S.C. § 119, the contents of which are hereby incorporated by reference in its entirety.

BACKGROUND

1. Field

The disclosure relates to a method of manufacturing or providing a light control member and a method of manufacturing or providing a display device including the light control member. More particularly, the disclosure relates to a method of manufacturing or providing a light control member including quantum dots and a method of manufacturing of providing a display device including the light control member.

2. Description of the Related Art

Various types of display devices that are applied to multimedia devices, such as television sets, mobile phones, tablet computers, navigation units, game units, or the like, are being developed. The display devices use a light control layer to reduce or effectively prevent colors from being mixed with each other. The light control layer includes quantum dots that absorb light and emit a light having a wavelength. Research is being conducted to improve a light efficiency of the quantum dots included in the light control layer.

SUMMARY

The disclosure provides a method of manufacturing or providing a light control member, which includes irradiating a light to a quantum dot to improve a light efficiency.

The disclosure provides a method of manufacturing or providing a display device including the light control member.

Embodiments provide a method of providing a light control member. The method includes providing a base substrate including a base layer and a plurality of barrier walls which are on the base layer and spaced apart from each other, providing a light control resin including a quantum dot in a concave portion defined between the barrier walls adjacent to each other, irradiating a first light having a wavelength equal to or greater than about 430 nanometers (nm) and equal to or smaller than about 500 nm to the light control resin, irradiating a second light having a wavelength shorter than the wavelength of the first light to the light control resin to which the first light is irradiated, and heat-treating the light control resin to which the second light is irradiated.

The irradiating of the first light is performed after the providing of the light control resin.

The method further includes preliminary heat-treating or vacuum drying the light control resin at a temperature lower than a temperature of the heat-treating of the light control resin, between the irradiating of the first light and the irradiating of the second light.

The irradiating of the first light is performed before the providing of the light control resin.

The method further includes preliminary heat-treating or vacuum drying the light control resin at a temperature lower than a temperature of the heat-treating of the light control resin, between the providing of the light control resin and the irradiating of the second light.

A first state of the light control resin before the irradiating of the first light is converted to a second state after the irradiating of the first light, the second state of the light control resin is converted to a third state after the irradiating of the second light, the third state of the light control resin is converted to a fourth state after the heat-treating, and a distribution density of the quantum dot of the light control resin gradually increases in converting of the first state to the fourth state.

A ratio of the distribution density of the quantum dot of the light control resin in the first state to the distribution density of the quantum dot of the light control resin in the fourth state is in a range from 1:1.4 to 1:1.5.

The irradiating of the first light is performed at a temperature equal to or greater than about 25 degrees Celsius (° C.) and equal to or smaller than about 80° C.

The second light has a center wavelength equal to or greater than about 300 nm and equal to or smaller than about 410 nm.

The irradiating of the second light includes curing the light control resin after the irradiating of the first light.

The providing of the light control resin is performed by an inkjet printing method.

The base substrate further includes a filter layer disposed between the base layer and each of the barrier walls, respectively, and the providing of the light control resin includes providing the light control resin on the filter layer.

The method further includes polishing the barrier walls. Each of the barrier walls includes a lower surface adjacent to the base layer and an upper surface opposing the lower surface, and the polishing is performed on the upper surface of the barrier walls after the heat-treating.

Embodiments provide a method of providing a display device including a first light emitting area, a second light emitting area and a third light emitting area. The method includes providing a display element layer and providing a light control member which is on the display element layer. The providing of the light control member includes providing a base substrate including a base layer and a plurality of barrier walls which are on the base layer and spaced apart from each other, providing a light control resin including a quantum dot in a concave portion defined between the barrier walls adjacent to each other, irradiating a first light having a center wavelength equal to or greater than about 430 nm and equal to or smaller than about 500 nm to the light control resin, irradiating a second light having a wavelength shorter than the wavelength of the first light to the light control resin to which the first light is irradiated, and heat-treating the light control resin to which the second light is irradiated.

The providing of the light control resin includes providing first, second, and third light control resins to respectively correspond to the first, second and third light emitting areas.

The first light control resin includes a first quantum dot, the second light control resin includes a second quantum dot and the third light control resin does not include a quantum dot (e.g., excludes the quantum dot).

The display element layer emits a first color light, the first quantum dot converts the first color light to a second color light having a wavelength longer than a wavelength of the first color light, and the second quantum dot converts the first color light to a third color light having a wavelength longer than the wavelength of the second color light.

The first color light is a blue light, the second color light is a red light and the third color light is a green light.

The irradiating of the first light is performed at a temperature equal to or greater than about 25° C. and equal to or smaller than about 80° C.

The method further includes polishing the barrier walls. Each of the barrier walls includes a lower surface adjacent to the base layer and an upper surface opposing the lower surface, and the polishing is performed on the upper surface of the barrier walls after the heat-treating.

According to one or more embodiment, the method of manufacturing or providing the light control member includes the irradiating of the light having the wavelength equal to or greater than about 430 nm and equal to or smaller than about 500 nm, and thus, the light efficiency of the light control member is improved.

Since the method of manufacturing or providing the display device includes the irradiating of the light having the wavelength equal to or greater than about 430 nm and equal to or smaller than about 500 nm, the light efficiency of the light control member is improved and a overshoot phenomenon is reduced.

BRIEF DESCRIPTION OF THE DRAWINGS

The above and other advantages will become readily apparent by reference to the following detailed description when considered in conjunction with the accompanying drawings where.

DETAILED DESCRIPTION

Figure 1:
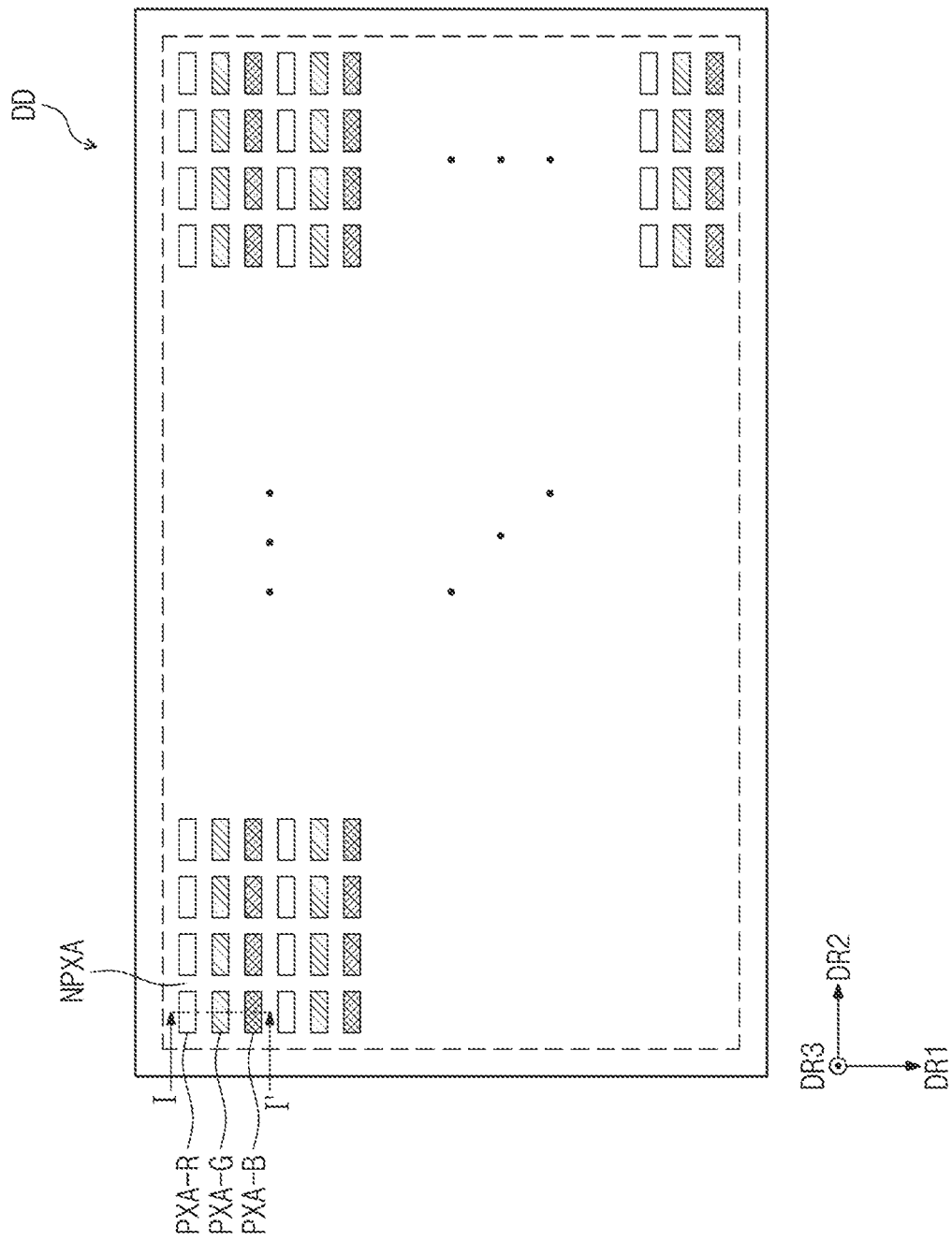
FIG. 1 is a plan view showing an embodiment of a display device.

The disclosure may be variously modified and realized in many different forms, and thus embodiments will be exemplified in the drawings and described in detail hereinbelow. However, the disclosure should not be limited to the disclosed forms, and be construed to include all modifications, equivalents, or replacements included in the spirit and scope of the disclosure.

In the disclosure, it will be understood that when an element or layer is referred to as being related to another element such as being "on", "connected to" or "coupled to" another element or layer, it can be directly on, connected or coupled to the other element or layer or intervening elements or layers may be present. When an element is referred to as being related to another element such as being "directly connected" to another element, there are no intervening elements present between a layer, film region, or substrate and another layer, film, region, or substrate. For example, the term "directly connected" may mean that two layers or two members are disposed without employing additional adhesive therebetween, are disposed to form an interface therebetween, etc.

Like numerals refer to like elements throughout. In the drawings, the thickness, ratio, and dimension of components are exaggerated for effective description of the technical content.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure.

The terminology used herein is for the purpose of describing particular embodiments only and is not intended to be limiting. As used herein, the singular forms, "a", "an" and "the" are intended to include the plural forms as well, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as shown in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a method of manufacturing or providing a light control member CCM and a method of manufacturing or providing a display device DD including the light control member CCM will be explained in detail with reference to the accompanying drawings.

Figure 2:
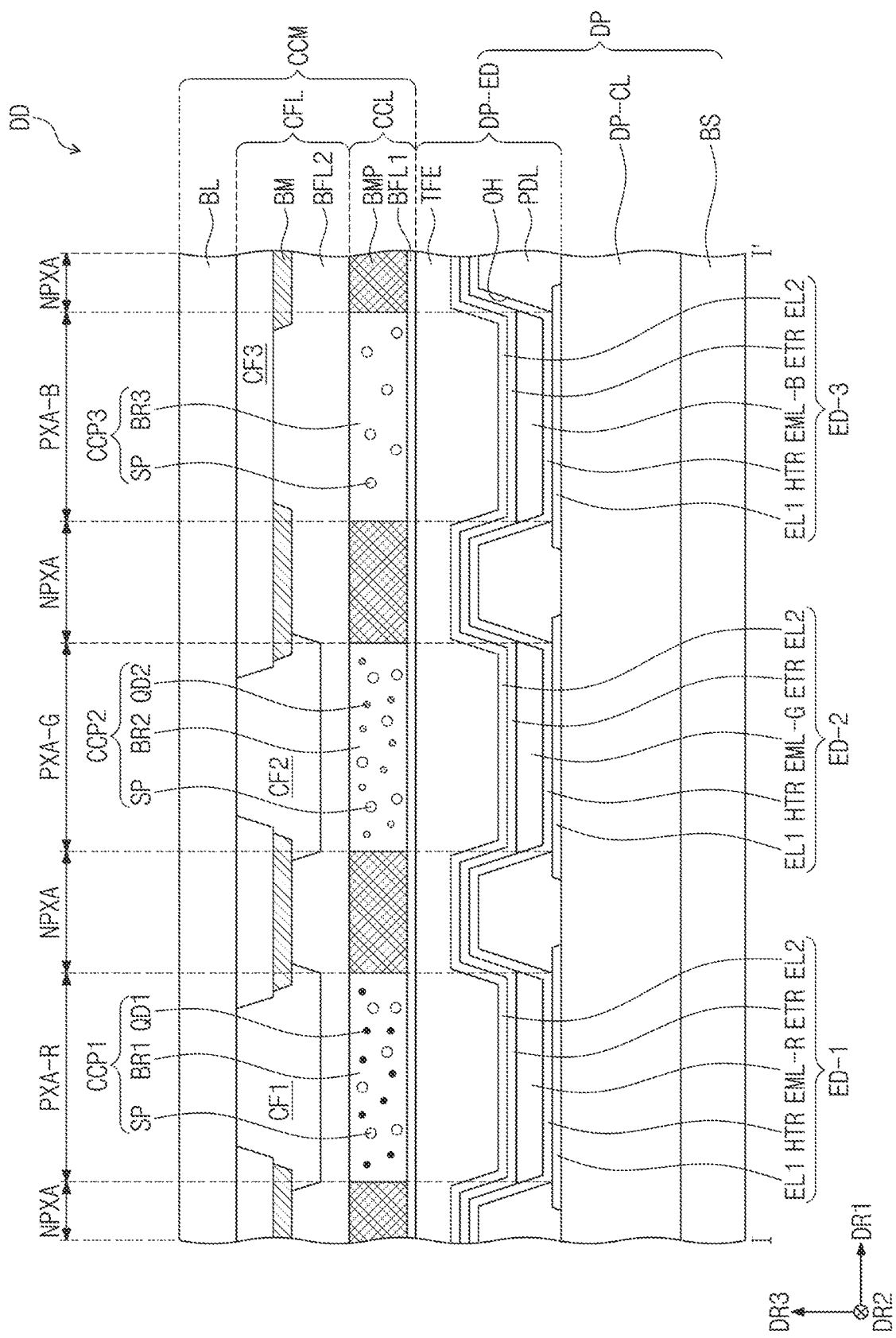
FIG. 2 is a cross-sectional view showing an embodiment a display device.

FIG. 1 is a plan view showing an embodiment of a display device DD, and FIG. 2 is a cross-sectional view showing the display device DD. FIG. 2 is a cross-sectional view taken along line I-I' of FIG. 1.

The display device DD may include a display panel DP and a light control member CCM which is disposed on the display panel DP. The display panel DP may be disposed facing the light control member CCM. The display panel DP may include light emitting elements ED-1, ED-2, and ED-3. The display device DD may include the light emitting elements ED-1, ED-2, and ED-3.

A light control layer CCL may be disposed on the display panel DP. The light control layer CCL may include a light converter. The light converter may be a quantum dot QD or a fluorescent substance. The light converter may emit a light incident thereto after converting a wavelength of the light (e.g., wavelength-convert the light). That is, the light control layer CCL may be a layer including the quantum dot QD or the fluorescent substance.

The light control layer CCL may include a plurality of light control portions CCP1, CCP2, and CCP3. The light control portions CCP1, CCP2, and CCP3 may be spaced apart from each other in a direction along the display panel DP. The light control portions CCP1, CCP2, and CCP3 may be respectively include or formed by light control resins RS-R, RS-G, and RS-B (refer to FIG. 14).

The light control layer CCL may include a first light control portion CCP1 including a first quantum dot QD1 that converts a first color light provided from a light emitting element among the light emitting elements ED-1, ED-2, and ED-3 to a second color light, a second light control portion CCP2 including a second quantum dot QD2 that converts the first color light to a third color light, and a third light control portion CCP3 that transmits the first color light.

According to an embodiment, the first light control portion CCP1 may provide a red light as the second color light, and the second light control portion CCP2 may provide a green light as the third color light. The third light control portion CCP3 may provide a blue light that is the first color light from the light emitting element ED-1, ED-2, and ED-3 which is transmitted. As an example, the first quantum dot QD1 may be a red quantum dot, and the second quantum dot QD2 may be a green quantum dot. The above descriptions may be applied to the quantum dots QD1 and QD2.

In addition, the light control layer CCL may include a scatterer SP. The first light control portion CCP1 may include the first quantum dot QD1 and the scatterer SP, the second light control portion CCP2 may include the second quantum dot QD2 and the scatterer SP, and the third light control portion CCP3 may include the scatterer SP without including the quantum dot QD (e.g., excluding a quantum dot QD).

The scatterer SP may be an inorganic particle. As an example, the scatterer SP may include at least one of $TiO_2$, $ZnO$, $Al_2O_3$, $SiO_2$, and a hollow silica particle. The scatterer SP may include at least one of $TiO_2$, $ZnO$, $Al_2O_3$, $SiO_2$, and the hollow silica particle or may include two or more of $TiO_2$, $ZnO$, $Al_2O_3$, $SiO_2$, and the hollow silica, which are combined with each other.

The first light control portion CCP1, the second light control portion CCP2, and the third light control portion CCP3 may respectively include base resins BR1, BR2, and BR3 in which the quantum dots QD1 and QD2 and the scatterer SP are variously dispersed. According to an embodiment, the first light control portion CCP1 may include the first quantum dot QD1 and the scatterer SP which are dispersed in the first base resin BR1, the second light control portion CCP2 may include the second quantum dot QD2 and the scatterer SP which are dispersed in the second base resin BR2, and the third light control portion CCP3 may include the scatterer SP dispersed in the third base resin BR3. The base resins BR1, BR2, and BR3 may be a medium in which the quantum dots QD1 and QD2 and the scatterer SP are dispersed and may include various resin compositions that are generally referred to as a binder. As an example, the base resins BR1, BR2, and BR3 may be an acrylic-based resin, a urethane-based resin, a silicone-based resin, or an epoxy-based resin. The base resins BR1, BR2, and BR3 may be a transparent resin. According to an embodiment, a first base resin BR1, a second base resin BR2, and a third base resin BR3 may be the same as each other or different from each other.

The light control layer CCL may include a first barrier layer BFL1. The first barrier layer BFL1 may reduce or effectively prevent moisture and/or oxygen (hereinafter, referred to as moisture/oxygen) from entering. The first barrier layer BFL1 may be disposed on or corresponding to each of the light control portions CCP1, CCP2, and CCP3 to reduce or effectively prevent the light control portions CCP1, CCP2, and CCP3 from being exposed to the moisture/oxygen. The first barrier layer BFL1 may cover the light control portions CCP1, CCP2, and CCP3.

In addition, a second barrier layer BFL2 may be disposed between the light control portions CCP1, CCP2, and CCP3 and a filter layer CFL.

The barrier layers BFL1 and BFL2 may include at least one inorganic layer. That is, the barrier layers BFL1 and BFL2 may include an inorganic material.

According to an embodiment, the filter layer CFL may be disposed on the light control layer CCL in the display device DD. The filter layer CFL may face the light control layer CCL. As an example, the filter layer CFL may be disposed directly on the light control layer CCL. In this case, the second barrier layer BFL2 may be omitted.

The filter layer CFL (e.g., light filter layer or color filter layer) may include a light blocking portion BM and filters CF1, CF2, and CF3. The filter layer CFL may include a first filter CF1 transmitting the second color light, a second filter CF2 transmitting the third color light, and a third filter CF3 transmitting the first color light. As an example, the first filter CF1 may be a red filter, the second filter CF2 may be a green filter, and the third filter CF3 may be a blue filter.

Each of the filters CF1, CF2, and CF3 may include a polymer photosensitive resin and a pigment or a dye. The first filter CF1 may include a red pigment or dye, the second filter CF2 may include a green pigment or dye, and the third filter CF3 may include a blue pigment or dye, however, the invention is not limited thereto or thereby. According to an embodiment, the third filter CF3 may not include the pigment or the dye. The third filter CF3 may include the polymer photosensitive resin and may not include the pigment or the dye (e.g., may exclude the pigment or the dye). The third filter CF3 may be transparent. The third filter CF3 may include or be formed of a transparent photosensitive resin.

According to an embodiment, the first filter CF1 and the second filter CF2 may be a yellow filter. Although not shown in figures, the first filter CF1 and the second filter CF2 may be provided integrally with each other without being distinguished from each other. That is, the first filter CF1 and the second filter CF2 provided integrally may define a single color filter corresponding to more than one light emitting element among the light emitting elements ED-1, ED-2, and ED-3.

The light blocking portion BM may be a black matrix. The light blocking portion BM may include an organic light blocking material or an inorganic light blocking material, which includes a black pigment or a black dye. The light blocking portion BM may reduce or effectively prevent a light leakage phenomenon from occurring and may serve as a boundary between the filters CF1, CF2, and CF3 which are respectively adjacent to each other. According to an embodiment, the light blocking portion BM may include or be formed by the blue filter.

The first, second, and third filters CF1, CF2, and CF3 may be disposed to correspond to a respective light emitting area among a first light emitting area PXA-R, a second light emitting area PXA-G, and a third light emitting area PXA-B.

A base layer BL may be disposed on the filter layer CFL. The base layer BL may be a member providing a base surface on which the filter layer CFL and the light control layer CCL are disposed. The base layer BL may be a glass substrate, a metal substrate, or a plastic substrate, however, should not be limited thereto or thereby. According to an embodiment, the base layer BL may be an inorganic layer, an organic layer, or a composite layer. According to an embodiment, the base layer BL may be omitted.

According to an embodiment, the display device DD may further include a filling layer (not shown). The filling layer (not shown) may be disposed between a display element layer DP-ED and the base layer BL. The filling layer (not shown) may be an organic material layer. The filling layer (not shown) may include at least one of an acrylic-based resin, a silicone-based resin, and an epoxy-based resin.

The display panel DP may include a lower base layer BS and a circuit layer DP-CL and the display element layer DP-ED, which are disposed on the lower base layer BS in order from the lower base layer BS. The display element layer DP-ED may include a pixel definition layer PDL defining an opening OH in plural including a plurality of openings OH, the light emitting elements ED-1, ED-2, and ED-3 disposed between solid portions of the pixel definition layer PDL, and an encapsulation layer TFE disposed on the light emitting elements ED-1, ED-2, and ED-3.

The lower base layer BS may be a member providing a base surface on which the display element layer DP-ED is disposed. The lower base layer BS may be a glass substrate, a metal substrate, or a plastic substrate, however, should not be limited thereto or thereby. According to an embodiment, the lower base layer BS may be an inorganic layer, an organic layer, or a composite layer.

According to an embodiment, the circuit layer DP-CL may be disposed on the lower base layer BS and may include a plurality of transistors (not shown). Each of the transistors (not shown) may include a control electrode, an input electrode, and an output electrode. As an example, the circuit layer DP-CL may include a switching transistor and a driving transistor to drive the light emitting elements ED-1, ED-2, and ED-3 of the display element layer DP-ED. The circuit layer DP-CL may be connected to the light emitting elements ED-1, ED-2, and ED-3 of the display element layer DP-ED to drive the light emitting elements ED-1, ED-2, and ED-3 of the display element layer DP-ED for displaying an image, emitting a light, etc.

In FIG. 2, light emitting layers EML-R, EML-G, and EML-B and a first electrode EL1 of the light emitting elements ED-1, ED-2, and ED-3 are respectively disposed in openings OH defined in the pixel definition layer PDL, and a hole transport region HTR, an electron transport region ETR, and a second electrode EL2 may be commonly disposed over the light emitting elements ED-1, ED-2, and ED-3, however, should not be limited thereto or thereby. Different from the structure shown in FIG. 2, according to an embodiment, the hole transport region HTR and the electron transport region ETR may be disposed in the openings OH of the pixel definition layer PDL after being patterned. As an example, the hole transport region HTR, the light emitting layers EML-R, EML-G, and EML-B, and the electron transport region ETR of the light emitting elements ED-1, ED-2, and ED-3 may be patterned by an inkjet printing method.

The encapsulation layer TFE may cover the light emitting elements ED-1, ED-2, and ED-3. The encapsulation layer TFE may encapsulate the display element layer DP-ED. The encapsulation layer TFE may be a thin film encapsulation layer. The encapsulation layer TFE may have a single-layer structure or a multi-layer structure in which a plurality of layers is stacked.

The display device DD may include a non-light emitting area NPXA and a plurality of light emitting areas PXA-R, PXA-G, and PXA-B. The light emitting areas PXA-R, PXA-G, and PXA-B may be planar areas from which lights generated by the light emitting elements ED-1, ED-2, and ED-3 are emitted to outside the display device DD, respectively. The light emitting areas PXA-R, PXA-G, and PXA-B may be spaced apart from each other when viewed in a plane.

The display device DD and various layers and components thereof may be disposed in a plane defined by a first direction DR1 and a second direction DR2 which cross each other. A thickness direction of the display device DD and various layers and components thereof may be defined along a third direction DR3 crossing each of the first direction DR1 and the second direction DR2. As used herein, "viewed in a plane" is a view along the third direction DR3.

Each of the light emitting areas PXA-R, PXA-G, PXA-B may be defined by solid portions of the pixel definition layer PDL. The non-light emitting area NPXA may include a plurality of a non-light emitting areas NPXA in a cross-sectional view. The non-light emitting areas NPXA may be planar areas defined between the light emitting areas PXA-R, PXA-G, and PXA-B which are respectively adjacent to each other in a direction along the lower base layer BS and may correspond to the solid portions of the pixel definition layer PDL. Each of the light emitting areas PXA-R, PXA-G, and PXA-B may correspond to a pixel (e.g., display pixel). The pixel definition layer PDL may distinguish the light emitting elements ED-1, ED-2, and ED-3 from each other. The light emitting layers EML-R, EML-G, and EML-B of the light emitting elements ED-1, ED-2, and ED-3 may be disposed in the openings OH defined extended through the pixel definition layer PDL to be distinguished from each other.

The light emitting areas PXA-R, PXA-G, and PXA-B may be grouped into a plurality of groups according to colors of the lights generated and/or emitted by the light emitting elements ED-1, ED-2, and ED-3. The display device DD shown in FIGS. 1 and 2 may include three light emitting areas PXA-R, PXA-G, and PXA-B respectively emitting the red, green, and blue lights. As an example, the display device DD may include the first light emitting area PXA-R, the second light emitting area PXA-G, and the third light emitting area PXA-B, which are distinguished from each other.

According to an embodiment, the light emitting elements ED-1, ED-2, and ED-3 of the display device DD may emit color lights having different wavelength ranges from each other. As an example, the display device DD may include a first light emitting element ED-1 emitting the red light, a second light emitting element ED-2 emitting the green light, and a third light emitting element ED-3 emitting the blue light. That is, a red light emitting area PXA-R, a green light emitting area PXA-G, and a blue light emitting area PXA-B of the display device DD may correspond to the first light emitting element ED-1, the second light emitting element ED-2, and the third light emitting element ED-3, respectively.

However, the invention should not be limited thereto or thereby, and the first, second, and third light emitting elements ED-1, ED-2, and ED-3 may emit the lights having the same wavelength range as each other, or at least one of the first, second, and third light emitting elements ED-1, ED-2, and ED-3 may emit the light having a wavelength range different from the other. As an example, all the first, second, and third light emitting elements ED-1, ED-2, and ED-3 may emit the blue light.

According to an embodiment, the light emitting areas PXA-R, PXA-G, and PXA-B of the display device DD may be arranged in a stripe form. Referring to FIG. 1, each of a plurality of red light emitting areas PXA-R, a plurality of green light emitting areas PXA-G, and a plurality of blue light emitting areas PXA-B may be arranged along a second direction DR2. In addition, the red light emitting area PXA-R, the green light emitting area PXA-G, and the blue light emitting area PXA-B may be alternately arranged along a first direction DR1.

Although the light emitting areas PXA-R, PXA-G, and PXA-B are shown to be similar in size in FIGS. 1 and 2, however, they should not be limited thereto or thereby. According to an embodiment, the planar sizes (e.g., defined by dimensions along the first direction DR1 and the second direction DR2) of the light emitting areas PXA-R, PXA-G, and PXA-B may be different from each other depending on the wavelength ranges of the lights emitted therefrom. The sizes of the light emitting areas PXA-R, PXA-G, and PXA-B may mean sizes in a plane defined by the first direction DR1 and the second direction DR2 which cross each other.

The arrangement of the light emitting areas PXA-R, PXA-G, and PXA-B should not be limited to that shown in FIG. 1, and an order in which the red light emitting area PXA-R, the green light emitting area PXA-G, and the blue light emitting area PXA-B are arranged may be provided in various combinations according to characteristics of a display quality of the display device DD. As an example, the light emitting areas PXA-R, PXA-G, and PXA-B may be arranged in a pentile form or a lozenge form.

In addition, the light emitting areas PXA-R, PXA-G, and PXA-B may have different planar sizes from each other. As an example, the planar size of the green light emitting area PXA-G may be smaller than the planar size of the blue light emitting area PXA-B, however, should not be limited thereto or thereby.

Hereinafter, a method of manufacturing or providing the light control member CCM will be described in detail with reference to FIGS. 3 to 8.

Figure 3:
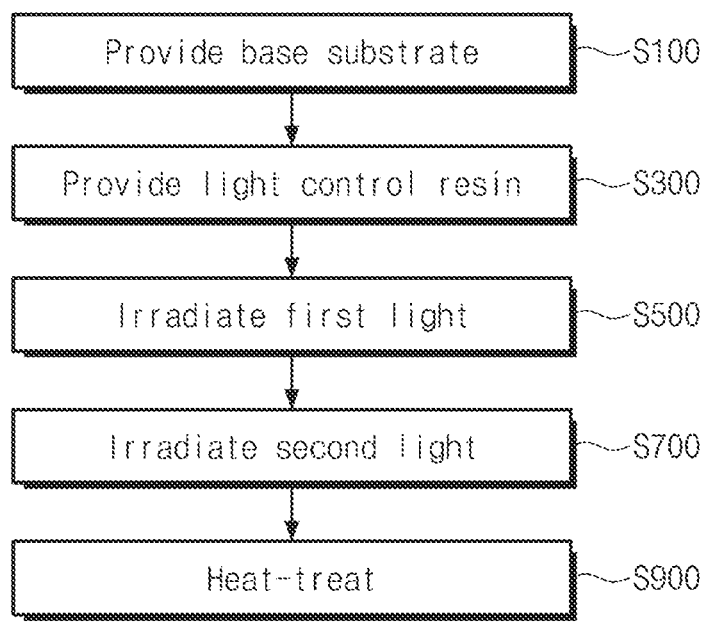
FIG. 3 is a flowchart showing an embodiment of a method of manufacturing a light control member.
Figure 4:
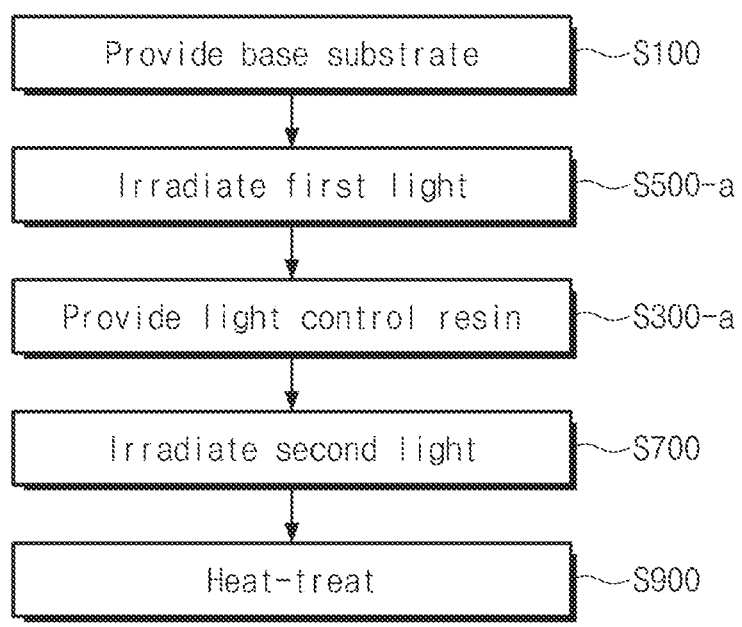
FIG. 4 is a flowchart showing an embodiment of a method of manufacturing a light control member.

FIG. 3 is a flowchart showing an embodiment of a method of manufacturing or providing the light control member CCM. FIG. 4 is a flowchart showing an embodiment of a method of manufacturing or providing the light control member CCM. FIGS. 5A, 5B, 6A, 6B, 7, and 8 are cross-sectional views showing processes in the method of manufacturing the light control member CCM.

Referring to FIGS. 3 and 4, the manufacturing method of the light control member CCM may include providing a base substrate BP (S100), providing a light control resin RS1 (S300), irradiating a first light LT1 (S500), irradiating a second light LT2 (S700), and heat-treating (S900). The providing of the light control resin (S300) may mean providing a light control resin RS1 on the base substrate BP.

The manufacturing method of the light control member CCM may include the providing of the light control resin RS1 (S300) and the irradiating of the first light LT1 (S500) between the providing of the base substrate BP (S100) and the irradiating of the second light LT2 (S700). The irradiating of the first light LT1 (S500) may be performed after the providing of the light control resin RS1 (S300). That is, the light control resin RS1 may be provided on the base substrate BP (S300), and then, the first light LT1 may be irradiated to the light control resin RS1 provided on the base substrate BP (S500).

According to an embodiment, providing the light control resin RS2 (S300-a) may be performed after irradiating the first light LT1 (S500-a). That is, the first light LT1 may be irradiated to the light control resin RS1 (S500-a), and then, a light control resin RS2 to which the first light LT1 has been irradiated (e.g., first irradiated light control resin) may be provided on the base substrate BP (S300-a).

Figure 5A:
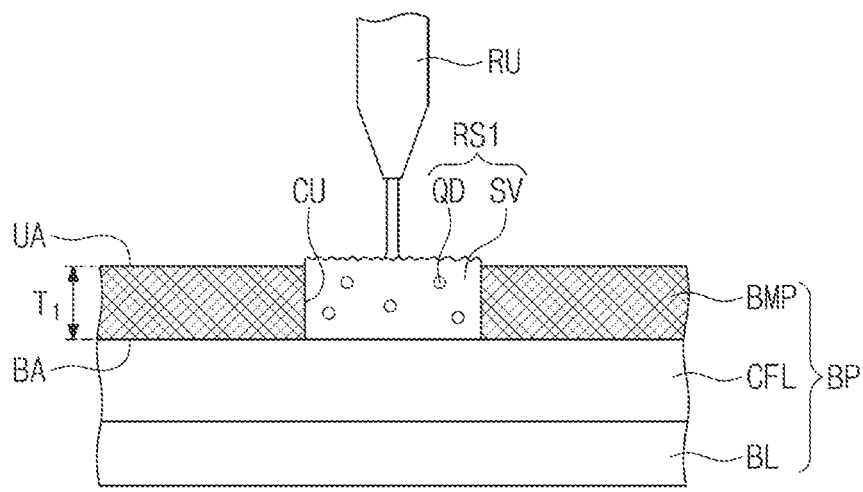
FIG. 5A is a view showing an embodiment of a method of manufacturing a light control member.
Figure 5A:
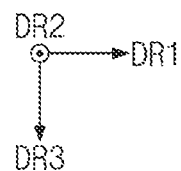

FIG. 5A shows the providing of the light control resin RS1. Referring to FIG. 5A, the base substrate BP may include the base layer BL and a barrier wall BMP provided in plural including a plurality of barrier walls BMP disposed on the base layer BL (e.g., barrier wall layer) and spaced apart from each other in a direction along the base layer BL.

According to an embodiment, the providing of the light control resin RS1 (S300) may include providing the light control resin RS1 in a concave portion CU defined between the barrier walls BMP which are adjacent to each other. In an embodiment, the concave portion CU exposes the light filter layer (e.g., the filter layer CFL) to outside the barrier wall layer, and the providing of the light control resin RS1 includes providing the light control resin RS1 contacting the light filter layer.

The light control resin RS1 may include an organic solvent SV and a quantum dot QD. The light control resin RS1 may have a first state before the first light LT1 (refer to FIG. 5B) is irradiated thereto (e.g., un-irradiated light control resin). The light control resin RS1 in the first state may have a density equal to or greater than about 1.2 grams per cubic centimeter (g/cm$^3$) and equal to or smaller than about 1.6 g/cm$^3$.

In the providing of the light control resin RS1 (S300) in a concave portion CU, the light control resin RS1 may be provided by an inkjet printing method, however, this is merely one example. As an example, the light control resin RS1 may be provided by a vacuum deposition method, a spin coating method, and a casting method. Un-irradiated light control resin (e.g., light control resin RS1 in FIG. 5A) may be provided by a resin applicator RU.

According to an embodiment, the filter layer CFL may be further disposed between the base layer BL and the barrier walls BMP. The concave portion CU may be defined between the filter layer CFL and solid portions of the barrier walls BMP which area adjacent to each other. According to an embodiment, the providing of the light control resin RS1 (S300) may include providing the light control resin RS1 in the concave portion CU defined between the filter layer CFL and the solid portions of the barrier walls BMP which are adjacent to each other.

Figure 5B:
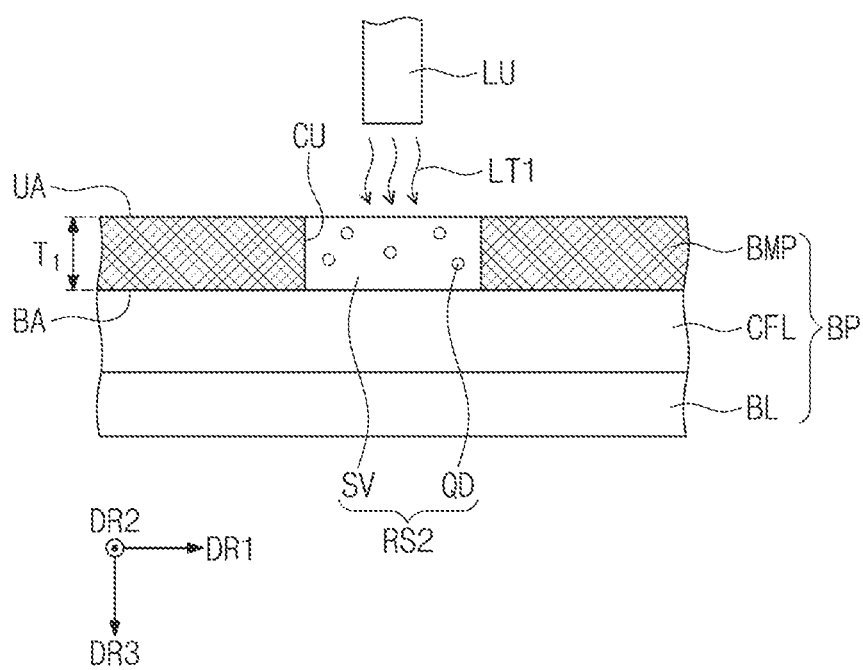
FIG. 5B is a view showing an embodiment of a method of manufacturing a light control member.

FIG. 5B shows the irradiating of the first light LT1. Referring to FIG. 5B, the irradiating of the first light LT1 (S500) may be performed after the providing of the light control resin RS1 (S300). The irradiating of the first light LT1 (S500) may include irradiating the first light LT1 to the light control resin RS1 (refer to FIG. 5A) in the first state thereof (e.g., un-irradiated light control resin). The irradiating of the first light LT1 (S500) may be performed by a light irradiator LU disposed above the light control resin RS1 in the first state thereof. The first light LT1 may have a wavelength equal to or greater than about 430 nanometers (nm) and equal to or smaller than about 500 nm.

The irradiating of the first light LT1 (S500) may be a process of aging the light control resin RS1 in the first state thereof. The irradiating of the first light LT1 (S500) may be performed at a temperature equal to or greater than about 25 degrees Celsius (° C.) and equal to or smaller than about 80° C. The irradiating of the first light LT1 (S500) may be performed by providing the first light LT1 having an intensity equal to or greater than about 100 milliwatts (mW) and equal to or smaller than about 2000 mW for about 10 minutes or more and about 360 minutes or less. In a case where the intensity of the first light LT1 is smaller than about 100 mW or the first light LT1 is irradiated less than about 10 minutes, a desired light efficiency may not be achieved, and in a case where the intensity of the first light LT1 is greater than about 2000 mW or the first light LT1 is irradiated more than about 360 minutes, the quantum dot QD may be damaged.

When the first light LT1 is irradiated, the light control resin RS1 (refer to FIG. 5A) in the first state may be converted into the light control resin RS2 in a second state (e.g., first irradiated light control resin). The light control resin RS2 in the second state may have a volume smaller than that of the light control resin RS1 (refer to FIG. 5A) in the first state. The light control resin RS2 in the second state may have a quantum dot distribution density greater than that of the light control resin RS1 (refer to FIG. 5A) in the first state.

As the manufacturing method of the light control member CCM includes the irradiating of the first light LT1 to the light control resin RS1 provided on the base substrate BP (S500), the light efficiency of the light control member CCM may be improved.

Figure 6A:
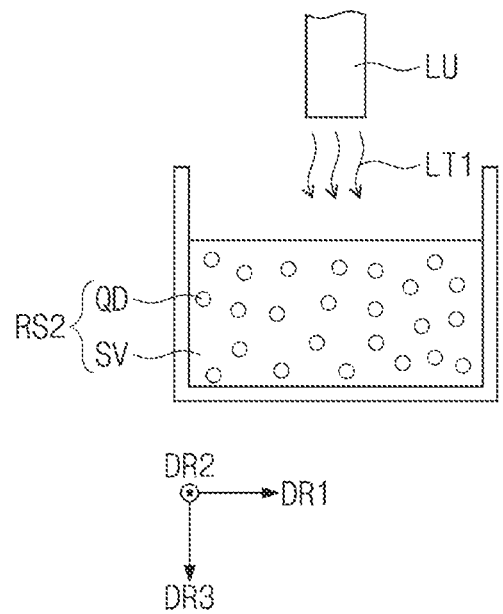
FIG. 6A is a view showing an embodiment of a method of manufacturing a light control member.
Figure 6B:
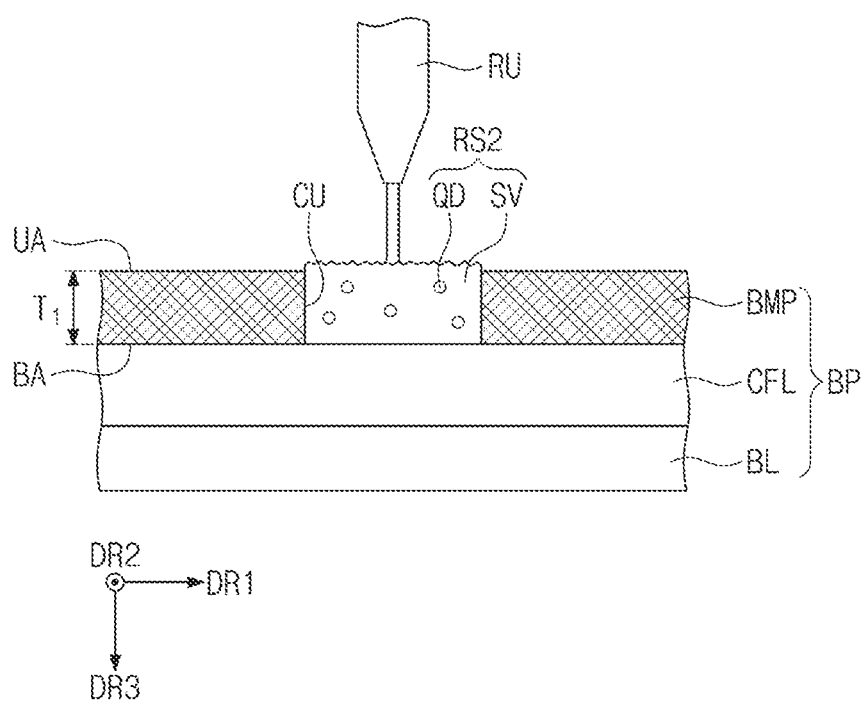
FIG. 6B is a view showing an embodiment of a method of manufacturing a light control member.

FIG. 6A shows the irradiating of the first light LT1 (S500-$a$). FIG. 6B shows the providing of the light control resin RS2 (S300-$a$).

Referring to FIGS. 6A and 6B, the providing of the first light LT1 (S300-$a$) may be performed prior to the providing of the light control resin RS2 in a concave portion CU (S300-$a$).

In the irradiating of the first light LT1 (S500-$a$), the first light LT1 may be irradiated to the light control resin RS1 (refer to FIG. 6A) in the first state, and the light control resin RS1 (refer to FIG. 6A) in the first state may be converted into the light control resin RS2 in the second state. The first light LT1 may have the wavelength equal to or greater than about 430 nm and equal to or smaller than about 500 nm. The light control resin RS2 in the second state may be provided in a temporary or intermediate container as shown in FIG. 6A before application of the light control resin RS2 to the base substrate BP.

The irradiating of the first light LT1 (S500-$a$) may include the aging of the light control resin RS1. The irradiating of the first light LT1 (S500-$a$) may be performed at the temperature equal to or greater than about 25° C. and equal to or smaller than about 80° C. The irradiating of the first light LT1 (S500-$a$) may include the providing of the first light LT1 having the intensity equal to or greater than about 100 mW and equal to or smaller than about 2000 mW for about 10 minutes or more and about 360 minutes or less. In a case where the intensity of the first light LT1 is smaller than about 100 mW or the first light LT1 is irradiated less than about 10 minutes, the desired light efficiency may not be achieved, and in a case where the intensity of the first light LT1 is greater than about 2000 mW or the first light LT1 is irradiated more than about 360 minutes, the quantum dot QD may be damaged.

As the manufacturing method of the light control member CCM includes the irradiating of the first light LT1 (S500-$a$), the light efficiency of the light control member CCM may be improved.

According to an embodiment, the providing of the light control resin (S300-$a$) may include the providing the light control resin RS2 in the second state thereof in the concave portion CU defined between the barrier walls BMP adjacent to each other. In the providing of the light control resin RS2 (S300-$a$), the light control resin RS2 may be provided by an inkjet printing method, however, this is merely one example, and the disclosure should not be limited thereto or thereby. Irradiated light control resin (e.g., light control resin RS2 in FIG. 5A) may be provided by a resin applicator RU.

Figure 7:
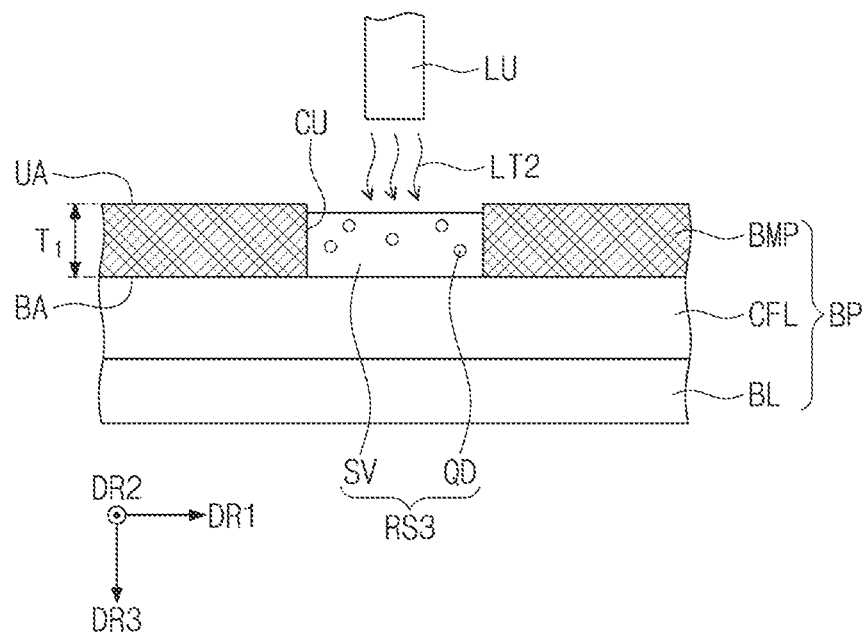
FIG. 7 is a view showing an embodiment of a method of manufacturing a light control member.

FIG. 7 shows the irradiating of the second light LT2 (S700).

Referring to FIG. 7, the irradiating of the second light LT2 (S700) may include irradiating the second light LT2 having a wavelength shorter than that of the first light LT1 (refer to FIGS. 5B and 6A) to the light control resin RS2 (refer to FIGS. 5B and 6B) as the first light LT1 (refer to FIGS. 5B and 6B) which is previously irradiated. The second light LT2 may have a center wavelength equal to or greater than about 300 nm and equal to or smaller than about 410 nm. The irradiating of the second light LT2 (S700) may include curing the light control resin RS2 (refer to FIGS. 5B and 6B) to which the first light LT1 (refer to FIGS. 5B and 6A) has been irradiated.

The irradiating of the second light LT2 (S700) may include the irradiating of the second light LT2 to the light control resin RS2 using the light irradiator LU. The first light LT1 (refer to FIGS. 5B and 6A) and the second light LT2 may be irradiated by the same light irradiator LU, however, this is merely one example. The first light LT1 (refer to FIGS. 5B and 6A) and the second light LT2 may be irradiated by different light irradiators.

In the irradiating of the second light LT2 (S700), the second light LT2 may be irradiated to the light control resin RS2 (refer to FIGS. 5B and 6B) in the second state thereof, and thus, the light control resin RS2 (refer to FIGS. 5B and 6B) in the second state may be converted into a light control resin RS3 in a third state (e.g., second irradiated light control resin). The light control resin RS3 in the third state may have a volume smaller than that of the light control resin RS2 (refer to FIGS. 5B and 6B) in the second state. The light control resin RS3 in the third state may have a quantum dot distribution density greater than that of the light control resin RS2 (refer to FIGS. 5B and 6B) in the second state. That is, the quantum dot distribution density may sequentially increase by conversion of the light control resin RS1 (refer to FIGS. 5A and 6A) in the first state to the light control resin RS3 in the third state.

Figure 8:
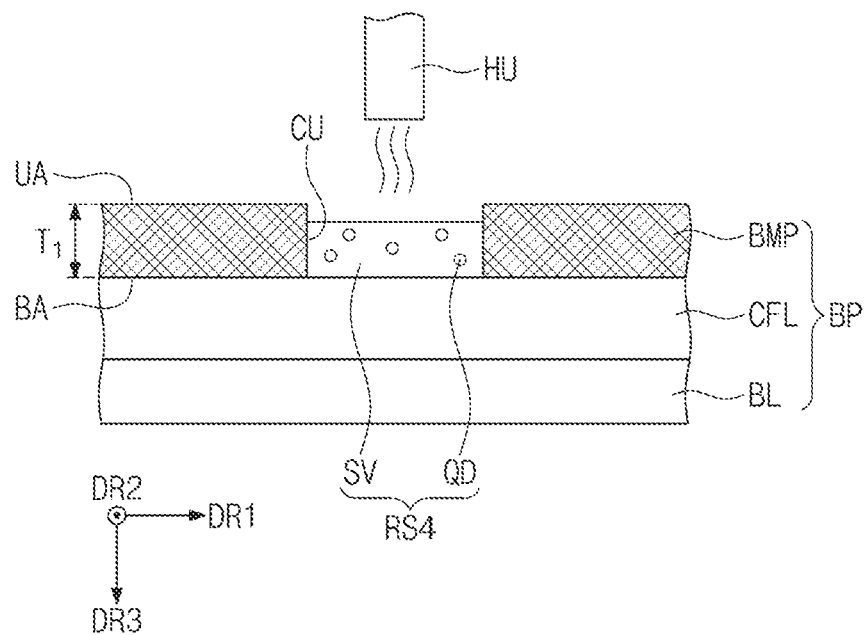
FIG. 8 is a view showing an embodiment of a method of manufacturing a light control member.

FIG. 8 shows the heat-treating (S900).

Referring to FIG. 8, the heat-treating (S900) may include heat-treating the light control resin RS3 (refer to FIG. 7) to which the second light LT2 (refer to FIG. 7) has been irradiated. The heat-treating (S900) may be performed by heating the light control resin RS3 (refer to FIG. 7) using a heat supply HU (e.g., heat supplier).

The heat-treating (S900) may include applying heat to the light control resin RS3 (refer to FIG. 7) in the third state to convert the light control resin RS3 (refer to FIG. 7) in the third state to a light control resin RS4 in a fourth state (e.g., heat-treated light control resin). The light control resin RS4 in the fourth state may have a volume smaller than that of the light control resin RS3 (refer to FIG. 7) in the third state. The light control resin RS4 in the fourth state may have a quantum dot distribution density greater than that of the light control resin RS3 (refer to FIG. 7) in the third state. That is, the quantum dot distribution density may sequentially increase by conversion of the light control resin RS1 (refer to FIGS. 5A and 6A) in the first state into the light control resin RS4 in the fourth state. A ratio of the quantum dot distribution density of the light control resin RS1 (refer to FIGS. 5A and 6A) in the first state to the quantum dot distribution density of the light control resin RS4 in the fourth state may be in a range from 1:1.4 to 1:1.5.

Figure 9A:
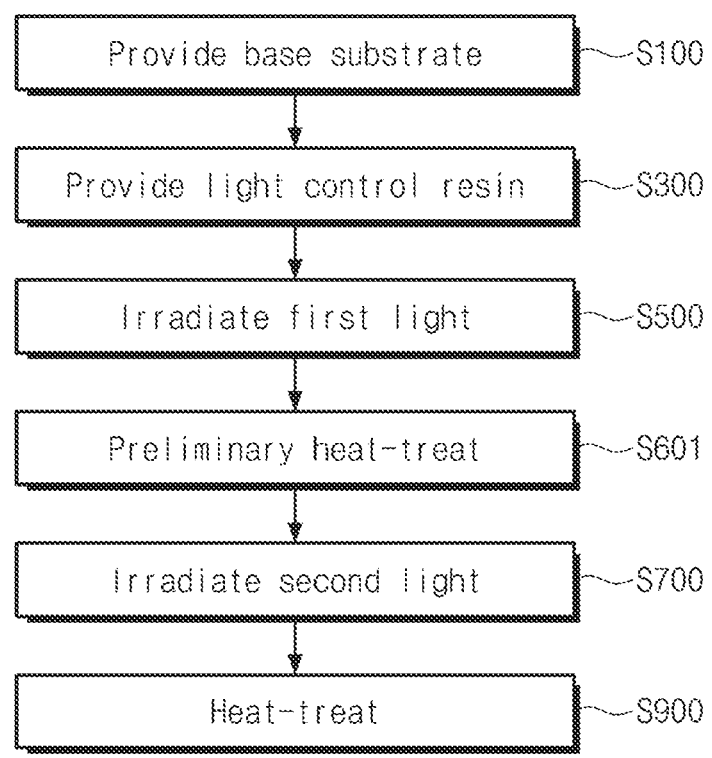
FIG. 9A is a flowchart showing an embodiment of a method of manufacturing a light control member.
Figure 9B:
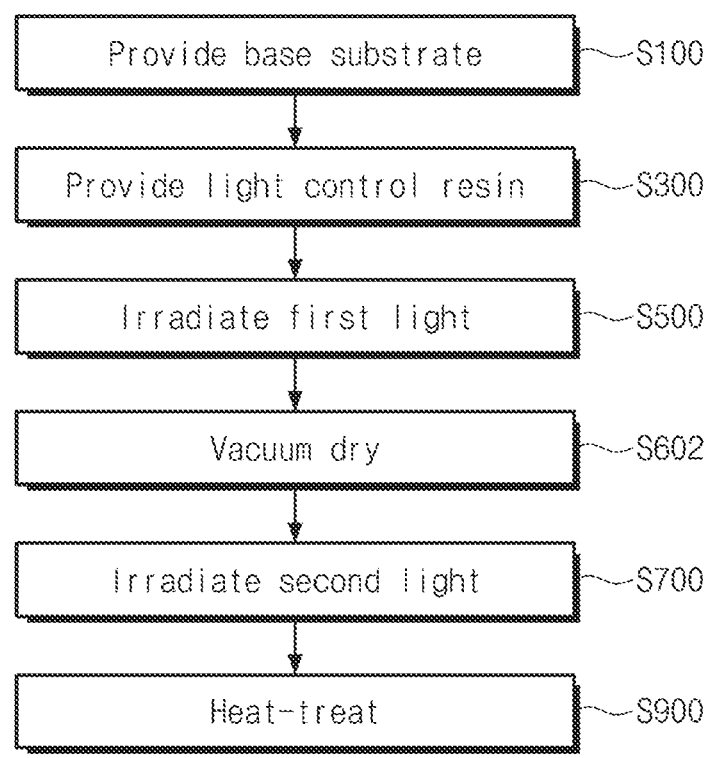
FIG. 9B is a flowchart showing an embodiment of a method of manufacturing a light control member.

FIGS. 9A and 9B are flowcharts showing embodiments of a method of manufacturing of providing the light control member CCM. FIGS. 9A and 9B show the manufacturing method of the light control member CCM shown in FIG. 3. Hereinafter, the manufacturing method of the light control member CCM will be described in detail with reference to FIGS. 9A and 9B. In FIGS. 9A and 9B, descriptions of the same elements as those described with reference to FIGS. 1 to 8 will be omitted, and different features will be mainly described.

Different from the manufacturing method of the light control member CCM described with reference to FIGS. 1 to 8, the manufacturing method of the light control member CCM described with reference to FIGS. 9A and 9B may further include preliminary heat-treating, which is performed at a temperature lower than that of the heat-treating (S900), or vacuum drying between the irradiating of the first light LT1 and the irradiating of the second light LT2.

Referring to FIGS. 9A and 9B, the manufacturing method of the light control member CCM may further include the preliminary heat-treating (S601), which is performed at the temperature lower than that of the heat-treating (S900), or the vacuum drying (S602), between the irradiating of the first light LT1 (S500) and the irradiating of the second light LT2 (S700). The preliminary heat-treating (S601) or the vacuum drying (S602) may be first curing the light control resin RS2 (refer to FIG. 5B) in the second state. As the manufacturing method of the light control member CCM includes the first curing of the light control resin RS2 (refer to FIG. 5B) in the second state, the quantum dot distribution density of the light control resin RS4 (refer to FIG. 8) in the fourth state may increase.

Figure 10A:
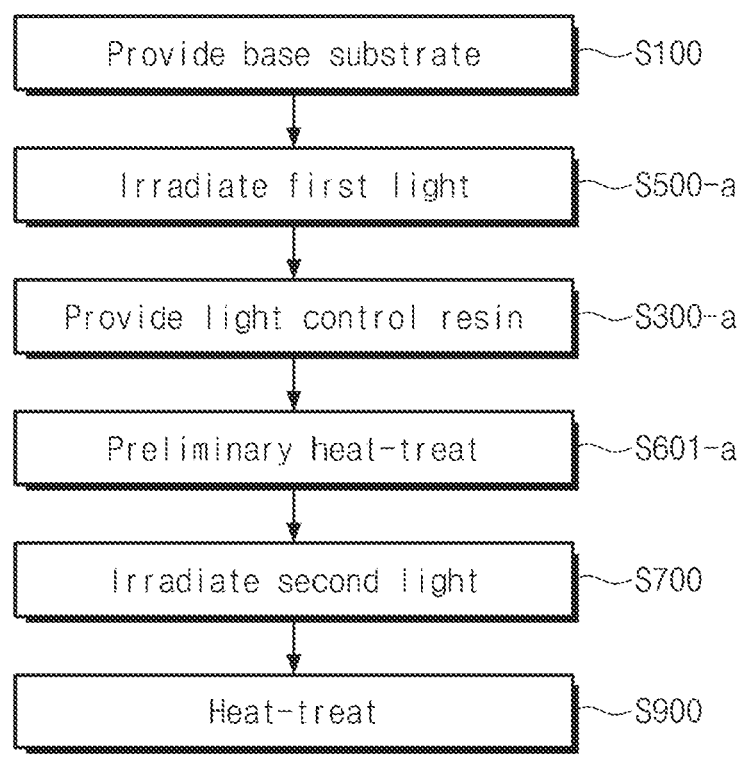
FIG. 10A is a flowchart showing an embodiment of a method of manufacturing a light control member.
Figure 10B:
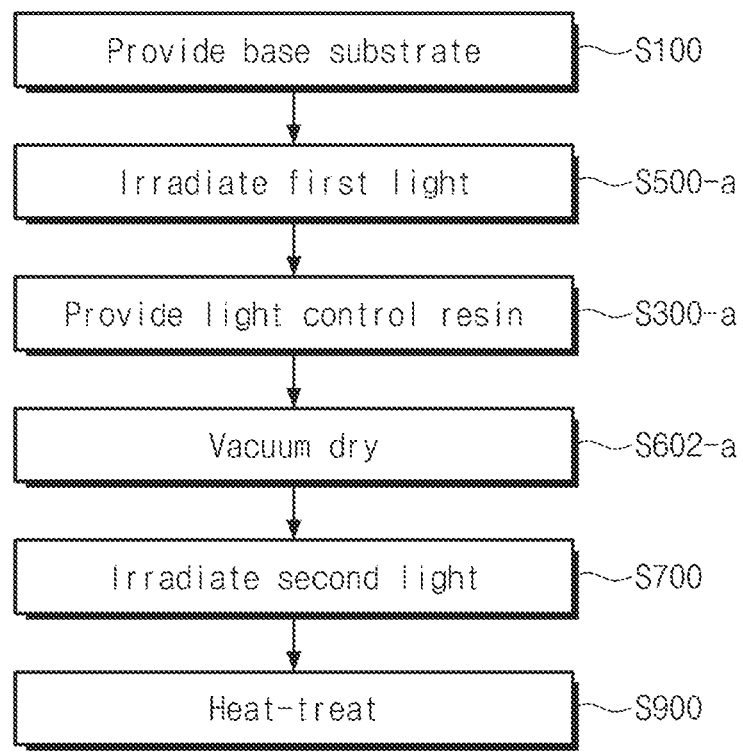
FIG. 10B is a flowchart showing an embodiment of a method of manufacturing a light control member.

FIGS. 10A and 10B are flowcharts showing embodiments of a method of manufacturing the light control member CCM. FIGS. 10A and 10B show the manufacturing method of the light control member CCM shown in FIG. 4. Hereinafter, the manufacturing method of the light control member CCM will be described in detail with reference to FIGS. 10A and 10B. In FIGS. 10A and 10B, descriptions of the same elements as those described with reference to FIGS. 1 to 8 will be omitted, and different features will be mainly described.

Different from the manufacturing method of the light control member CCM described with reference to FIGS. 1 to 8, the manufacturing method of the light control member CCM described with reference to FIGS. 10A and 10B may further include preliminary heat-treating, which is performed at a temperature lower than that of the heat-treating (S900), or vacuum drying between the providing of the light control resin and the irradiating of the second light LT2.

Referring to FIGS. 10A and 10B, the manufacturing method of the light control member CCM may further include the preliminary heat-treating (S601-a), which is performed at the temperature lower than that of the heat-treating (S900), or the vacuum drying (S602-a), between the providing of the light control resin (S300-a) and the irradiating of the second light LT2 (S700). The preliminary heat-treating (S601-a) or the vacuum drying (S602-a) may be first curing the light control resin RS2 (refer to FIG. 6B) in the second state. As the manufacturing method of the light control member CCM includes the first curing of the light control resin RS2 (refer to FIG. 6B) in the second state, the quantum dot distribution density of the light control resin RS4 (refer to FIG. 8) in the fourth state may increase.

Figure 11A:
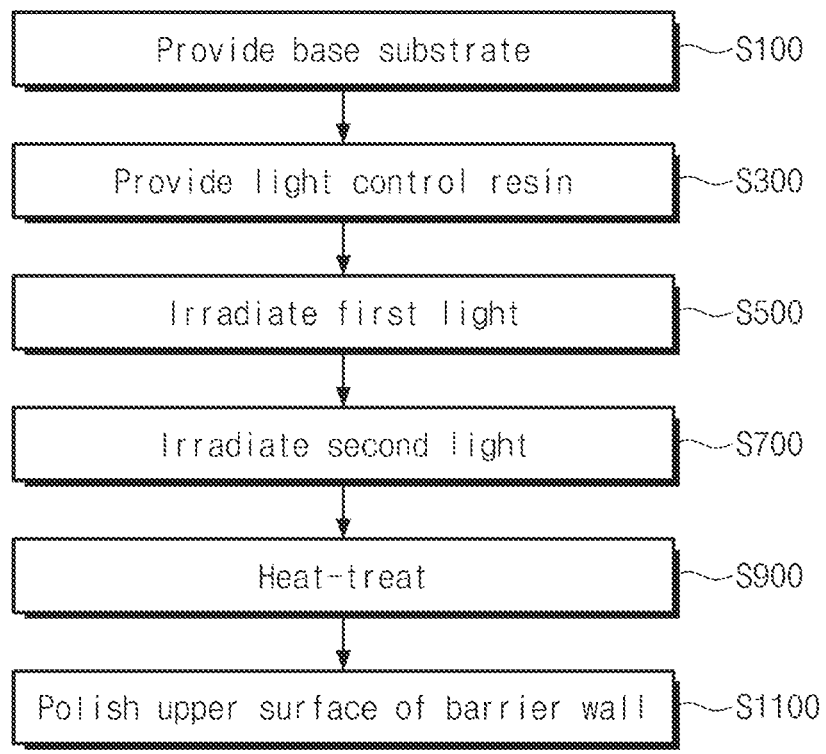
FIG. 11A is a flowchart showing an embodiment of a method of manufacturing a light control member.
Figure 11B:
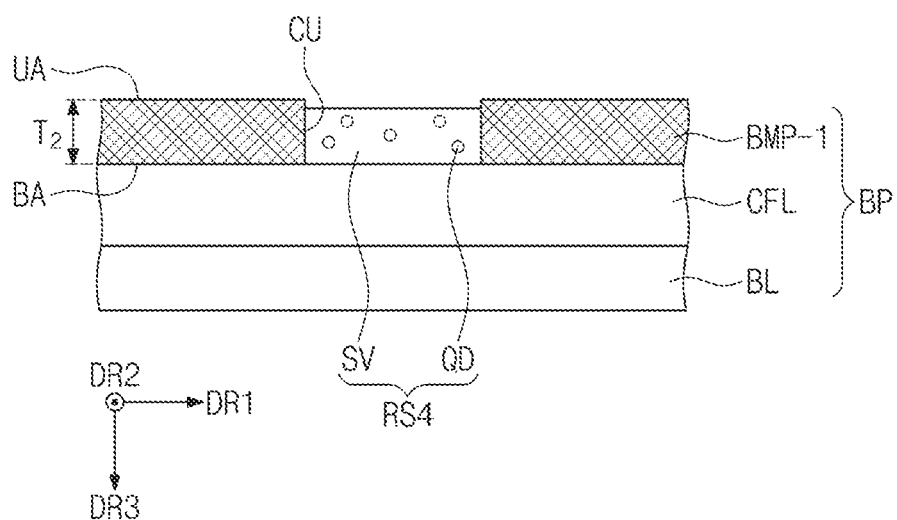
FIG. 11B is a view showing an embodiment of a method of manufacturing a light control member.

FIG. 11A is a flowchart showing an embodiment of a method of manufacturing the light control member CCM. FIG. 11B shows a cross-sectional view of the light control member CCM related to FIG. 11A. Hereinafter, the manufacturing method of the light control member CCM will be described in detail with reference to FIGS. 11A and 11B. In FIGS. 11A and 11B, descriptions of the same elements as those described with reference to FIGS. 1 to 8 will be omitted, and different features will be mainly described.

Referring to FIGS. 11A and 11B, the manufacturing method of the light control member CCM may further include polishing an upper surface UA of a barrier wall BMP (S1100) after heat-treating (S900). The barrier wall BMP (refer to FIG. 8) may include a lower surface BA closer to the base layer BL then the upper surface UA and the upper surface UA opposing the lower surface BA. In an embodiment, each of the barrier walls BMP may include an upper surface UA which is furthest from the display element layer DP-ED, and the providing of the polishing including polishing of the upper surface UA of the barrier walls BMP.

The polishing of the upper surface UA of the barrier wall BMP (refer to FIG. 8) (S1100) may be performed to decrease a height of the barrier wall BMP (refer to FIG. 8) by polishing the upper surface UA of the barrier wall BMP (refer to FIG. 8). The barrier wall BMP-1 (e.g., polished barrier wall) may have a second thickness $T_2$ smaller than a first thickness $T_1$ (refer to FIG. 8) of the barrier wall BMP (refer to FIG. 8) that is not polished (e.g., un-polished barrier wall).

The manufacturing method of the light control member CCM may include the polishing of the upper surface UA of the barrier wall BMP (S1100), and thus, an amount of the light emitted from the light emitting element layer DP-ED (refer to FIG. 2) and incident into the light control portions CCP1, CCP2, and CCP3 (refer to FIG. 2) may increase. A difference in thickness between the barrier wall BMP-1 which is polished and the light control resin RS4 (refer to FIG. 8) may be equal to or greater than about 1 micrometer (μm) and equal to or smaller than about 2 μm. When the difference in thickness between the barrier wall BMP-1 and the light control resin RS4 (refer to FIG. 8) is greater than about 2 μm, the amount of the light incident into the light control portions CCP1, CCP2, and CCP3 (refer to FIG. 2) may decrease in the display device DD (refer to FIG. 2) that is a final product due to a light scattering and absorption by an air layer between the display element layer DP-ED (refer to FIG. 2) and light control portions CCP1, CCP2, and CCP3 (refer to FIG. 2). When the difference in thickness between the barrier wall BMP-1 and the light control resin RS4 (refer to FIG. 8) is smaller than about 1 μm, a color mixture may occur between lights emitted from different light emitting elements ED1 to ED3 (refer to FIG. 2) in the display device DD (refer to FIG. 2) that is a final product.

Hereinafter, an embodiment of a manufacturing method of the display device DD will be described in detail with reference to FIGS. 2 and 12 to 14. In FIGS. 2 and 12 to 14, descriptions of the same elements as those described with reference to FIGS. 1, 3 to 8 will be omitted, and different features will be mainly described.

Figure 12:
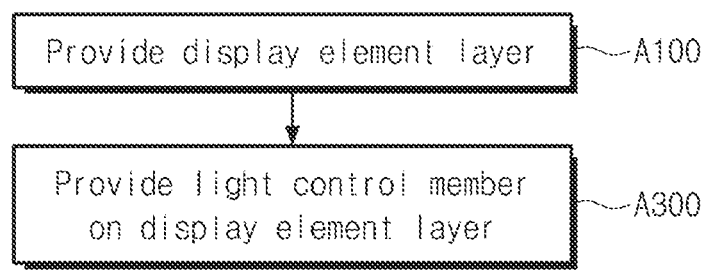
FIG. 12 is a flowchart showing an embodiment of a method of manufacturing a display device.
Figure 13:
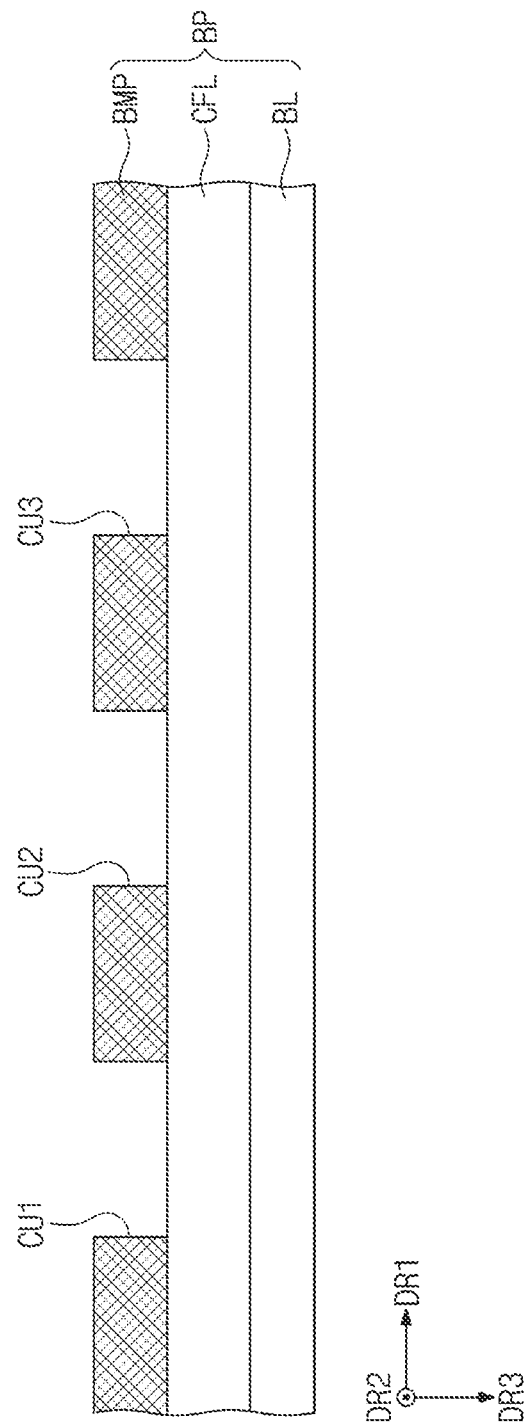
FIG. 13 is a view showing an embodiment of a method of manufacturing a display device.
Figure 14:
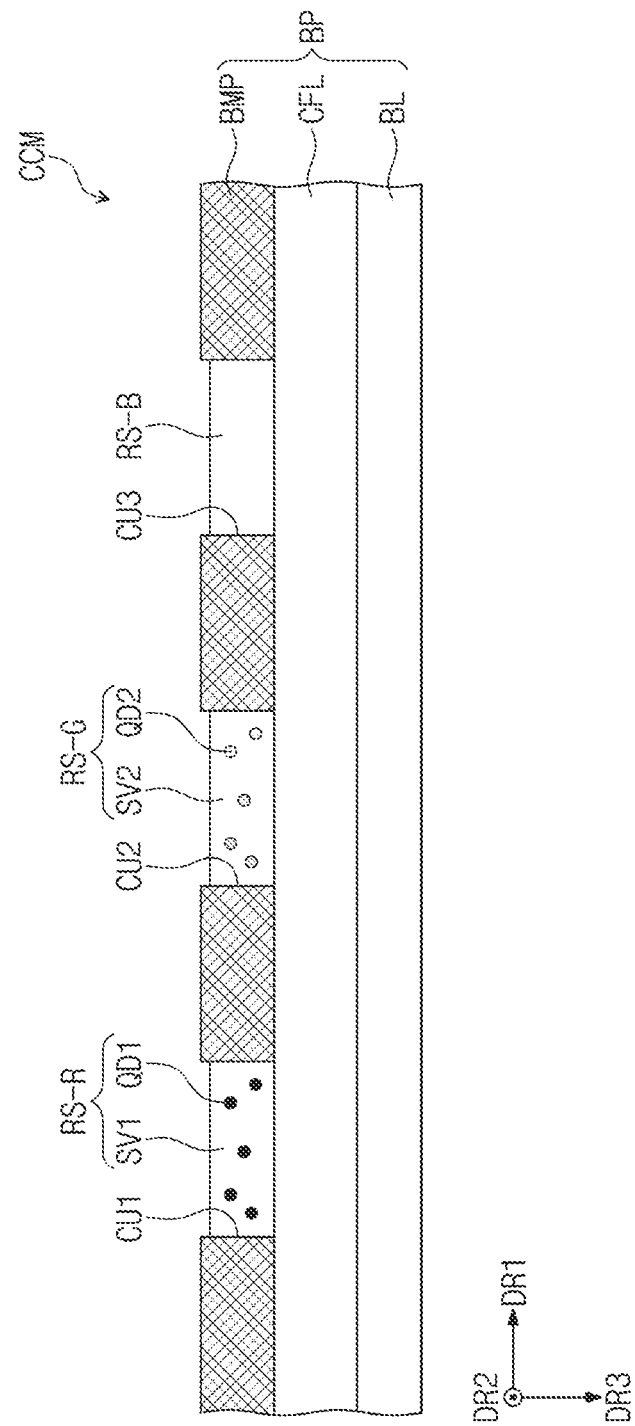
FIG. 14 is a view showing an embodiment of a method of manufacturing a display device.

FIG. 12 is a flowchart showing an embodiment of a method of manufacturing a display device DD. FIG. 13 is a cross-sectional view of the display device DD related to FIG. 12. FIG. 14 is a cross-sectional view of the display device DD related to FIG. 12.

Referring to FIGS. 2 and 12, the manufacturing method of the display device DD may include providing the display element layer DP-ED (A100) and providing the light control member CCM on the display element layer DP-ED (A300).

The providing of the display element layer DP-ED (A100) may include providing the display element layer DP-ED including the first light emitting element ED-1, the second light emitting element ED-2, and the third light emitting element ED-3.

The providing of the light control member CCM (A300) may include providing the light control member CCM on the display element layer DP-ED to face the display element layer DP-ED. The providing of the light control member (A300) may include providing the light control member CCM to overlap the first, second, and third light emitting elements ED-1, ED-2, and ED-3 with the light control member CCM.

According to an embodiment, the providing of the light control member CCM (A300) may include the providing of the base substrate BP (S100) (refer to FIG. 3), the providing of the light control resin RS1 (S300) (refer to FIG. 3), the irradiating of the first light LT1 (S500) (refer to FIG. 3), the irradiating of the second light LT2 (S700) (refer to FIG. 3), and the heat-treating (S900) (refer to FIG. 3).

According to an embodiment, the manufacturing method of the light control member CCM may include the providing of the light control resin RS1 (S300) (refer to FIG. 3) and the irradiating of the first light LT1 (S500) (refer to FIG. 3) between the providing of the base substrate BP (S100) (refer to FIG. 3) and the irradiating of the second light LT2 (S700) (refer to FIG. 3). According to an embodiment, the irradiating of the first light LT1 (S500) (refer to FIG. 3) may be performed after the providing of the light control resin RS2 (S300) (refer to FIG. 3). According to an embodiment, the providing of the light control resin RS2 (S500-a) (refer to FIG. 4) may be performed after the irradiating of the first light LT1 (S300-a) (refer to FIG. 4).

Referring to FIG. 13, a base substrate BP may include a base layer BL and a plurality of barrier walls BMP disposed on the base layer BL (e.g., barrier wall layer). A first concave portion CU1, a second concave portion CU2, and a third concave portion CU3 may be sequentially defined between the barrier walls BMP which are respectively adjacent to each other. The first concave portion CU1, the second concave portion CU2, and the third concave portion CU3 may be sequentially arranged along a first direction DR1 along the base layer BL and may be spaced apart from each other along the first direction DR1.

The base substrate BP may further include a filter layer CFL disposed between the base layer BL and the barrier walls BMP.

Referring to FIGS. 2 and 14, the providing of the light control resin RS1 (S300) (refer to FIG. 3) may include providing a first light control resin RS-R in the first concave portion CU1, providing a second light control resin RS-G different from the first light control resin RS-R in the second concave portion CU2, and providing a third light control resin RS-B in the third concave portion CU3. The first light control resin RS-R may include a first solvent SV1 and a first quantum dot QD1. The second light control resin RS-B may include a second solvent SV2 different from the first solvent SV1 and a second quantum dot QD2 different from the first quantum dot QD1. The third light control resin RS-B may not include the quantum dot QD.

According to an embodiment, the irradiating of the first light LT1 (S500) (refer to FIG. 3), the irradiating of the second light LT2 (S700) (refer to FIG. 3), and the heat-treating (S900) (refer to FIG. 3) may be performed on the first light control resin RS-R, the second light control resin RS-G, and the third light control resin RS-B. As a result, the light control member CCM including the first, second, and third light control portions CCP1, CCP2, and CCP3 shown in FIG. 2 may be manufactured or provided.

According to an embodiment, each of the first light emitting element ED-1, the second light emitting element ED-2, and the third light emitting element ED-3 may emit a first color light. The first quantum dot QD1 may convert the first color light to a second color light having a wavelength longer than that of the first color light, and the second quantum dot QD2 may convert the first color light to a third color light having a wavelength longer than that of the second color light. That is, the first light control resin RS-R may convert the first color light to the second color light, the second light control resin RS-G may convert the first color light to the third color light, and the third light control resin RS-B may not convert the first color light to another color light (e.g., may transmit the first color light). As an example, the first color light may be the blue light, the second color light may be the red light, and the third color light may be the green light. That is, the first quantum dot QD1 may be a red quantum dot, and the second quantum dot QD2 may be a green quantum dot.

According to an embodiment, the providing of the light control member CCM (A300) may include providing a plurality of light control resins including the first, second, and third light control resins RS-R, RS-G, and RS-B to respectively correspond to the first, second, and third light emitting areas PXA-R, PXA-G, and PXA-B. As a result, the display device DD including the first, second, and third light emitting areas PXA-R, PXA-G, and PXA-B and the first, second, and third light control portions CCP1, CCP2, and CCP3 respectively corresponding to the first, second, and third light emitting areas PXA-R, PXA-G, and PXA-B as shown in FIG. 2 may be provided.

According to an embodiment, the providing of the light control member CCM (A300) may include disposing the light control member CCM on the display element layer DP-ED such that the first concave portion CU1, the second concave portion CU2, and the third concave portion CU3 may respectively correspond to the first light emitting element ED-1, the second light emitting element ED-2, and the third light emitting element ED-3. As a result, the display device DD including the first, second, and third light emitting elements ED-1, ED-2, and ED-3 and the first, second, and third light control portions CCP1, CCP2, and CCP3 respectively corresponding to the first, second, and third light emitting elements ED-1, ED-2, and ED-3 as shown in FIG. 2 may be provided.

Hereinafter, the invention will be described in more detail through embodiment examples. The following embodiment examples are merely examples to aid understanding of the disclosure, and the invention should not be limited thereto or thereby.

The following Table 1 shows a result of measuring the light efficiency of the light control member CCM implemented by varying a time of irradiation of the first light LT1.

Embodiment example 1 shows the result when the first light LT1 is irradiated to the light control resin RS1 before the light control resin RS2 is provided on the base substrate, and Embodiment example 2 shows the result when the first light LT1 is irradiated to the light control resin RS1 after the light control resin RS1 is provided on the base substrate BP. The first light LT1 has a center wavelength of about 450 nm and an intensity of about 500 mW.

TABLE 1

|  | Irradiation time of first light (min.) | Light efficiency (%) | Light efficiency change (%) | Overshoot (%) |
|---|---|---|---|---|
| Embodiment example 1 | 0 (reference) | 28 | 100 | 5.4 |
|  | 60 | 28.3 | 101.1 | 4.2 |
|  | 120 | 28.7 | 102.5 | 3.8 |
|  | 180 | 29 | 103.6 | 2.7 |
| Embodiment example 2 | 0 (reference) | 28 | 100 | 5.0 |
|  | 60 | 28.7 | 102.5 | 3.5 |
|  | 120 | 29.3 | 104.6 | 2.1 |
|  | 180 | 30.2 | 107.9 | 0.6 |

In Table 1, the light efficiency in percent (%) is a ratio of the light efficiency of the quantum dot QD included in the light control resin RS1 of an embodiment to about 100% of the light efficiency of the quantum dot QD itself. In Table 1, the light efficiency change (%) is a relative ratio of the light efficiency of the quantum dot QD included in the provided light control resin manufactured by irradiating the first light LT1 when the light efficiency of the quantum dot QD included in the provided light control resin manufactured without irradiating the first light LT1 is 100%. When the light emitting element facing the light control member CCM which is manufactured according to an embodiment, is driven, a phenomenon in which the light efficiency of the quantum dot QD is recovered occurs. This phenomenon is called an overshoot. The overshoot (%) is the rate of increase in the light efficiency of the quantum dot QD after driving the light emitting element with respect to the light efficiency of the quantum dot QD before driving the light emitting element. As the overshoot increases, color changes and spot defects in the display device DD including the light emitting element easily occur due to the change in luminance. Referring to the cases in which the first light LT1 is irradiated for about 60 minutes to about 180 minutes in embodiment examples 1 and 2 of Table 1, as the irradiation time of the first light LT1 increases, the light efficiency and the light efficiency change increase, and the overshoot decreases.

Accordingly, as the manufacturing method of the light control member CCM includes the irradiating of the light having the wavelength of about 450 nm to the light control resin RS1 including the quantum dot QD, the light efficiency of the light control member CCM increases, and the overshoot phenomenon of the display device DD including the light control member CCM decreases.

According to one or more embodiment, as the manufacturing method of the light control member CCM includes the irradiating of the light having the wavelength equal to or greater than about 430 nm and equal to or smaller than about 500 nm to the quantum dot QD, the light control member CCM having the improved light efficiency may be manufactured.

According to one or more embodiment, as the manufacturing method of the light control member CCM includes the irradiating of the light having the wavelength equal to or greater than about 430 nm and equal to or smaller than about 500 nm to the light control resin RS1, the light control member CCM may have the improved light efficiency, and the overshoot of the display device DD may be reduced.

Although the embodiments have been described, it is understood that the invention should not be limited to these embodiments but various changes and modifications can be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. A method of providing a light control member, comprising:
    providing a base substrate comprising a barrier wall layer comprising a plurality of barrier walls spaced apart from each other to define a concave portion between adjacent barrier walls;
    providing a light control resin material comprising a quantum dot, in the concave portion of the base substrate;
    providing a first light having a wavelength equal to or greater than about 430 nanometers and equal to or smaller than about 500 nanometers to an un-irradiated light control resin to provide a first irradiated light control resin;

providing a second light having a wavelength shorter than the wavelength of the first light to the first irradiated light control resin to provide a second irradiated light control resin; and providing heat-treating of the second irradiated light control resin to provide a heat-treated light control resin of the light control member which is in the concave portion of the base substrate.

2. The method of claim 1, wherein
the providing of the light control resin material includes providing the un-irradiated light control resin as the light control resin material in the concave portion of the base substrate, and
the providing of the first light includes providing the first light to the un-irradiated light control resin which is in the concave portion of the base substrate.

3. The method of claim 2, further comprising:
providing the heat-treating of the second irradiated light control resin at a temperature, and
providing preliminary heat-treating or vacuum drying of the first irradiated light control resin at a temperature lower than the temperature of the heat-treating of the second irradiated light control resin, between the providing of the first light and the providing of the second light.

4. The method of claim 1, wherein the providing of the light control resin material includes providing the first irradiated light control resin as the light control resin material in the concave portion of the base substrate after the providing of the first light to the un-irradiated light control resin.

5. The method of claim 4, further comprising:
providing the heat-treating of the second irradiated light control resin at a temperature, and
providing preliminary heat-treating or vacuum drying of the first irradiated light control resin at a temperature lower than the temperature of the heat-treating of the second irradiated light control resin, between the providing of the light control resin material and the providing of the second light.

6. The method of claim 1, wherein
each of the un-irradiated light control resin, the first irradiated light control resin, the second irradiated light control resin and the heat-treated light control resin has a distribution density of the quantum dot, and
the distribution density of the quantum dot increases in order of the un-irradiated light control resin, the first irradiated light control resin, the second irradiated light control resin and the heat-treated light control resin.

7. The method of claim 6, wherein a ratio of the distribution density of the quantum dot of the un-irradiated light control resin to the distribution density of the quantum dot of the heat-treated light control resin is in a range from 1:1.4 to 1:1.5.

8. The method of claim 1, wherein the providing of the first light is performed at a temperature equal to or greater than about 25 degrees Celsius and equal to or smaller than about 80 degrees Celsius.

9. The method of claim 1, wherein the second light has a center wavelength equal to or greater than about 300 nanometers and equal to or smaller than about 410 nanometers.

10. The method of claim 1, wherein the providing of the second light comprises curing the first irradiated light control resin, after the providing of the first light.

11. The method of claim 1, wherein the providing of the light control resin material in the concave portion of the base substrate includes an inkjet printing method.

12. The method of claim 1, wherein
the base substrate further comprises:
a light filter layer, and
a base layer facing the barrier wall layer with the light filter layer therebetween,
the concave portion exposes the light filter layer to outside the barrier wall layer, and
the providing of the light control resin material comprises providing the light control resin material contacting the light filter layer.

13. The method of claim 1, further comprising after the providing of the heat-treating of the second irradiated light control resin, providing polishing of the plurality of barrier walls,
wherein
the base substrate further comprises a base layer facing the barrier wall layer,
each of the plurality of barrier walls comprises a lower surface and an upper surface which opposes the lower surface and is further from the base layer than the lower surface, and
the providing of the polishing includes polishing the upper surface of the plurality of the barrier walls.

14. A method of providing a display device comprising:
providing a plurality of light emitting areas including a first light emitting area, a second light emitting area and a third light emitting area; and
in each of the plurality of light emitting areas:
providing a display element layer; and
providing a light control member facing the display element layer,
wherein the providing of the light control member comprises:
providing a barrier wall layer which includes a plurality of barrier walls spaced apart from each other which define a concave portion between adjacent barrier walls and corresponding to a respective light emitting area among the plurality of light emitting areas;
providing a light control resin material comprising a quantum dot in the concave portion of the barrier wall layer;
providing a first light having a wavelength equal to or greater than about 430 nanometers and equal to or smaller than about 500 nanometers to an un-irradiated light control resin to provide a first irradiated light control resin;
providing a second light having a wavelength shorter than the wavelength of the first light to the first irradiated light control resin to provide a second irradiated light control resin; and
providing heat-treating of the second irradiated light control resin to provide a heat-treated light control resin of the light control member which is in the concave portion of the barrier wall layer.

15. The method of claim 14, wherein the providing of the light control resin material comprises providing a plurality of light control resins including a first light control resin, a second light control resin and a third light control resin to respectively correspond to the first light emitting area, the second light emitting area and the third light emitting area.

16. The method of claim 15, wherein the first light control resin comprises a first quantum dot, the second light control resin comprises a second quantum dot, and the third light control resin excludes the quantum dot.

17. The method of claim 14, wherein the providing of the first light is performed at a temperature equal to or greater than about 25 degrees Celsius and equal to or smaller than about 80 degrees Celsius.

18. The method of claim 14, further comprising after the providing of the heat-treating of the second irradiated light control resin, providing polishing of the plurality of barrier walls,
wherein
each of the plurality of barrier walls comprises an upper surface which is furthest from the display element layer, and
the providing of the polishing including polishing the upper surface of the plurality of barrier walls.

19. The method of claim 14, wherein the providing of the light control resin material comprises providing the un-irradiated light control resin as the light control resin material in the concave portion of the barrier wall layer.

20. The method of claim 14, wherein the providing of the light control resin material comprises providing the first irradiated light control resin as the light control resin material in the concave portion of the barrier wall layer.

\* \* \* \* \*